United States Patent [19]

Stanley et al.

[11] 4,338,168
[45] Jul. 6, 1982

[54] HYDROMETALLURGICAL TREATMENT OF COPPER-BEARING HEMATITE RESIDUE

[75] Inventors: Robert W. Stanley, Kirkland; Serge Monette, Longueuil; Derek G. E. Kerfoot, St. Albert, all of Canada

[73] Assignee: Noranda Mines Limited, Toronto, Canada

[21] Appl. No.: 233,516

[22] Filed: Feb. 11, 1981

[30] Foreign Application Priority Data

Jun. 10, 1980 [CA] Canada .................................. 353676

[51] Int. Cl.$^3$ ............................................... C25C 1/12
[52] U.S. Cl. ..................................... 204/108; 423/36; 423/41; 423/146
[58] Field of Search ...................... 423/35, 36, 41, 145, 423/146; 204/108

[56] References Cited

U.S. PATENT DOCUMENTS

| 3,434,947 | 3/1969 | Steintveit . | |
|---|---|---|---|
| 3,493,365 | 2/1970 | Pickering et al. . | |
| 3,793,430 | 2/1974 | Weston | 423/41 |
| 3,798,304 | 3/1974 | Weston | 423/41 |
| 3,959,437 | 3/1976 | Rastas et al. . | |
| 3,985,857 | 10/1976 | Menendez | 423/36 |

FOREIGN PATENT DOCUMENTS

| 787853 | 6/1968 | Canada . |
|---|---|---|
| 793766 | 9/1968 | Canada . |
| 994109 | 8/1976 | Canada . |

OTHER PUBLICATIONS

Treatment of Zinc Leach Plant Residues by the Jarosite Process, G. Steintveit, *Advances in Extractive Metallurgy and Refining*, edited by M. J. Jones for the Institution of Mining and Metallurgy, London, 1972, pp. 521–528.
Jarosite Process Boosts Zinc Recovery in Electrolytic Plants by J. Wood and C. Haigle, *World Mining*, Sep. 1972, pp. 34–38.
How Outokumpu Conversion Process Raises Zn Recovery by Huggare, T–L et al, *World Mining*, Feb. 1974, pp. 36–42.

*Primary Examiner*—Brian E. Hearn
*Attorney, Agent, or Firm*—Fleit & Jacobson

[57] ABSTRACT

A method is provided for recovering copper values from a copper-bearing hematite residue in a single stage. It comprises leaching the residue in an aqueous sulphuric acid solution in the presence of ammonium, sodium or potassium ions, at a temperature between about 80° C. and the boiling point of the solution so that copper values are dissolved while iron is precipitated as jarosite. The method is particularly suitable for the treatment of residues resulting from an oxidizing pressure leach of copper concentrates.

4 Claims, 3 Drawing Figures

HYDROMETALLURGICAL TREATMENT OF COPPER-BEARING HEMATITE RESIDUE

This invention relates to a hydrometallurgical treatment of copper-bearing hematite residue. More particularly, the invention relates to a method of recovering copper values from copper-bearing hematite residue in a single stage by dissolving such copper values into an aqueous sulphuric acid solution, while precipitating the iron as jarosite.

There is known a hydrometallurgical method of recovering copper values from copper concentrates, which comprises:

(a) forming an aqueous leach solution containing chloride or bromide ions in a predetermined concentration;

(b) dispersing copper concentrates in said leach solution to form a slurry;

(c) carrying out a leaching operation of said slurry at an elevated temperature and under an overpressure of oxygen as well as with the concentration of the chloride or bromide ions such as to transform a major portion of the copper values present in the concentrates into a solid basic copper sulphate;

(d) separating resulting leach residue containing such basic copper sulphate from the leach solution; and (e) recovering the copper values from said leach residue.

In the above method, the initial aqueous leach solution may be formed with no acid or may be acidified, preferably to the extent that the molar ratio $H^+/Cu$ is between about 0.15/1 and 0.65/1, and the chloride or bromide ions provided therein are preferably in a concentration such that the molar ratio of $Cl^-/Cu$ or $Br^{--}/Cu$ is greater than about 0.08/1, and the leaching operation is preferably carried out at a temperature between about 115° C. and about 160° C. and at an oxygen pressure above 100 psig, while agitating the slurry. This known method is disclosed and claimed in Canadian Pat. No. 994,109 issued Aug. 3, 1976 to Noranda Mines Limited.

The leach residue separated in step (d) of the above method contains, apart from the basic copper sulphate, some elemental sulphur (S°), some hematite ($Fe_2O_3$) and other minor constituents, as is indicated on page 7, lines 10-12 of said Canadian patent.

It is a prime objective in designing a hydrometallurgical process for the treatment of copper concentrates, to provide a clean separation of copper from iron and sulphur and to recover a major part of the sulphur as elemental sulphur, rather than as sulphur dioxide gas or as sulphate ion in solution. In meeting this objective, the process of Canadian Pat. No. 994,109 is successful. However, it has been found that usually only about 90-93% of the copper content of the concentrate is converted by this process to basic copper sulphate which can be dissolved in a subsequent mild sulphuric acid leach (e.g. at a pH of about 2.5) while the remaining copper is intimately associated with the hematite portion of the residue and can only be solubilized by dissolving a major part of the hematite in more concentrated sulphuric acid to produce a liquor containing a high concentration of iron and a low concentration of copper (e.g. about 30-40 gpl Fe and about 2-5 gpl Cu). As will be readily appreciated by a man skilled in the art, such a solution is not readily amenable to normal methods of copper recovery, for example, by direct electrowinning or by cementation on metallic iron. In fact, solutions containing in excess of 5 gpl dissolved iron are rather difficult to treat or to recycle within the process, because iron accumulates within the system and must then be removed by some special means to maintain a suitable balance. Furthermore, even if copper were to be recovered from such high iron solutions, e.g. by direct cementation or by solvent extraction, it would still be necessary to remove the dissolved iron from solution to render the solution suitable for discard.

In electrolytic zinc practice, it is known that ferric iron can be precipitated from acidic solutions containing dissolved iron and zinc, as a sodium, potassium or ammonium jarosite at a temperature below the boiling point of the solution and a pH of about 1.5, provided that the pH can be held constant. Since the formation of jarosite releases sulphuric acid, it is necessary to add a neutralizing agent, such as zinc calcine, to the system to maintain a constant pH. Such process is disclosed in Canadian Pat. No. 793,766 issued Sept. 3, 1968 to Det Norske Zinkkompani A/S, and in the corresponding U.S. Pat. No. 3,434,947 of Mar. 25, 1969, as well as in the paper "Treatment of Zinc Leach Plant Residues by the Jarosite Process", G. Steinveit, Advances in Extractive Metallurgy and Refining-edited by M. J. Jones for the Institution of Mining and Metallurgy, London, 1972, pages 521-528.

If such process were to be applied to the hydrometallurgical copper system to recover copper values from a hematite residue, it would be necessary to find a suitable neutralizing agent to replace the zinc calcine used in the zinc system. Cupric oxide would be the obvious substitute, but unfortunately cupric oxide is not normally available either as a relatively pure mineral or as a process intermediate product, such as zinc calcine. Obviously, lime or limestone could be added to neutralize the free acid, but this is undesirable in practice since the resulting solution would be saturated with calcium sulphate and thus highly susceptible to gypsum scaling problems.

Another very similar process is disclosed in Canadian Pat. No. 787,853 issued June 18, 1968 to Electrolytic Zinc Company of Australasia Limited, and in the corresponding U.S. Pat. No. 3,493,365 of Feb. 3, 1970, as well as in the article "Jarosite Process" by J. Wood and C. Haigle, World Mining, September 1972, pages 34-38. Essentially, this process provides a first leaching stage for the zinc ferrite residue in a solution containing a high concentration of acid and then a separate jarosite precipitation stage in the presence of potassium, sodium or ammonium ions. The jarosite precipitation can be carried out either at a temperature below the boiling point of the solution, at atmospheric pressure, while maintaining the concentration of sulphuric acid solution at a level which allows jarosite precipitation (pH of about 1.5), or at superatmospheric pressure and at elevated temperature.

According to this prior art, two basic reactions take place in two separate stages, namely the zinc ferrite residue dissolution reaction carried out in the first stage in high concentration sulphuric acid solution and which can be represented as follows:

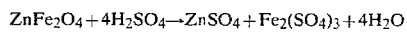

$$ZnFe_2O_4 + 4H_2SO_4 \rightarrow ZnSO_4 + Fe_2(SO_4)_3 + 4H_2O$$

and the jarosite precipitation reaction carried out in a second stage in a mild sulphuric acid solution which can be represented as follows, when ammonium sulphate is used as the reagent:

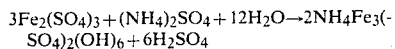

As already mentioned above, such a system would not be very practical for the treatment of copper-bearing hematite residue because the high acid dissolution reaction would produce a liquor containing a high concentration of iron and a low concentration of copper which is not readily amenable to further treatment and, furthermore, it would involve an expensive two-stage treatment in which the second stage, namely the jarosite precipitation, must be carried out with neutralization to a pH of about 1.5 and/or under high temperature and pressure conditions.

There is also known a hydrometallurgical process (the so-called "Conversion Process") for the treatment of a raw material containing an oxide and a ferrite of at least one of the non-ferrous metals, zinc, copper and cadmium. This process is disclosed in U.S. Pat. No. 3,959,437 issued May 25, 1976 to Rastas et al. and in the article "How Outokumpu Conversion Process Raises Zn Recovery" by Huggare, T-L. et al., World Mining, February 1974, pp 36–42. According to this process, a ferrite bearing material, particularly a zinc ferrite residue, is converted in a single stage conversion (acid leach-iron precipitation) process to an acid insoluble jarosite compound, while zinc, copper and cadmium are simultaneously solubilized and remain in the final solution. As indicated in the U.S. Pat. No. 3,959,437, this process was applied to ferrites resulting from neutral leaching of zinc calcine and containing, for example, 20.8% Zn, 38% Fe, 0.47% Cu, 0.19% Cd and 3.5% Pb. After a retention time varying from 8 hours to 24 hours, a solution was obtained which always contained in excess of 5 gpl, and mostly in excess of 10 gpl dissolved iron.

In fact, all the above described processes relate to the treatment of ferrite bearing materials and it is, therefore, clear that there has not existed heretofore a method for the recovery of copper from materials containing hematite, particularly copper-bearing hematite residues containing about 1–5% Cu and especially residues resulting from an oxidizing pressure leach of copper concentrates.

It has now been surprisingly discovered that it is possible to treat copper-bearing hematite residue in a single stage operation which results in 60-90% extraction of the residual copper, and simultaneously precipitates iron from solution as a jarosite. The novel process is particularly advantageous for treating copper-bearing hematite residue remaining after the basic copper sulphate dissolution step in the process such as disclosed in Canadian Pat. No. 994,109 because the resulting solution, which contains the dissolved copper values and less than 5 gpl dissolved iron, can be recycled to the basic copper sulphate dissolution stage and reused therein. The iron content of the recycle solution precipitates as ferric hydroxide and does not therefore report to the leach liquor from the basic copper sulphate dissolution step, which forms the feed to a copper electrowinning operation. In this way, the overall extraction of copper from the concentrate to solution is increased from 90–93% to 96–99% by the method of the present invention, which is a very significant improvement.

It is, therefore, the principal object of the present invention to provide a simple and efficient method of recovering copper values from a copper-bearing hematite residue in a single stage by dissolving the copper values in an aqueous sulphuric acid solution while precipitating the iron as jarosite.

Other objects and advantages of the invention will be apparent from the following more detailed description.

Basically, the novel method of recovering copper values from a copper-bearing hematite residue in a single stage comprises leaching said residue in an aqueous sulphuric acid solution in the presence of ammonium, sodium or potassium ions, at a temperature between about 80° C. and the boiling point of said solution, so that copper values are dissolved while iron is precipitated as jarosite. The hematite so treated can be a residue resulting from an oxidizing pressure leach of copper concentrates or from any other source and it normally contains a much higher concentration of iron (usually above 30%) than of copper (usually between 2–3%). The leaching is preferably carried out at about 95°–98° C., although any temperature between about 80° C. and the boiling point of the solution is suitable and is allowed to proceed until the final solution contains less than 5 gpl dissolved iron. The ammonium, sodium or potassium ions are preferably introduced in the form of their sulphates, although, obviously, they can be introduced in any other suitable form, such as hydroxides or carbonates, and can be used alone or in combination. Small amounts of an oxidizing agent, such as manganese ore, are also preferably added into the aqueous sulphuric acid leach solution to oxidize any ferrous ions during the course of the leach.

The present invention also includes a hydrometallurgical method of recovering copper values from copper concentrates which comprises:

(a) forming an aqueous leach solution containing chloride or bromide ions in a predetermined concentration;

(b) dispersing copper concentrates in said leach solution to form a slurry;

(c) carrying out the leaching operation of said slurry at an elevated temperature and under an overpressure of oxygen as well as with the concentration of the chloride or bromide ions such as to transform a major portion of the copper values present in the concentrates into a solid basic copper sulphate;

(d) separating resulting leach residue containing such basic copper sulphate from the leach solution;

(e) dissolving said residue containing basic copper sulphate in a mild sulphuric acid leach to form a high copper, low iron solution;

(f) separating said high copper, low iron solution from remaining hematite residue and purifying it to remove chloride or bromide ions and minor element impurities and then subjecting said purified solution to electrowinning for recovery of copper;

(g) leaching the remaining hematite residue in an aqueous sulphuric acid solution and in the presence of ammonium, sodium and/or potassium ions to simultaneously solubilize copper values still remaining in the hematite residue, while converting a major portion of the hematite to ammonium, sodium and/or potassium jarosite; and (h) separating resulting low iron, copper-bearing solution from the jarosite containing residue and recovering copper values therefrom.

The leaching of the hematite residue in step (g) is preferably carried out using spent electrolyte from step (f) to produce the low iron, copper bearing solution containing less than 5 gpl dissolved iron, which can be recycled to the mild sulphuric acid leach step (e). This step (e) can thus be carried out at a pH of about 2.5 using a mixture of the low iron, copper-bearing solution from step (h) and of spent electrolyte from step (f).

BRIEF DESCRIPTION OF THE DRAWINGS

The invention will now further be described with reference to the appended drawings in which.

Figure 1:
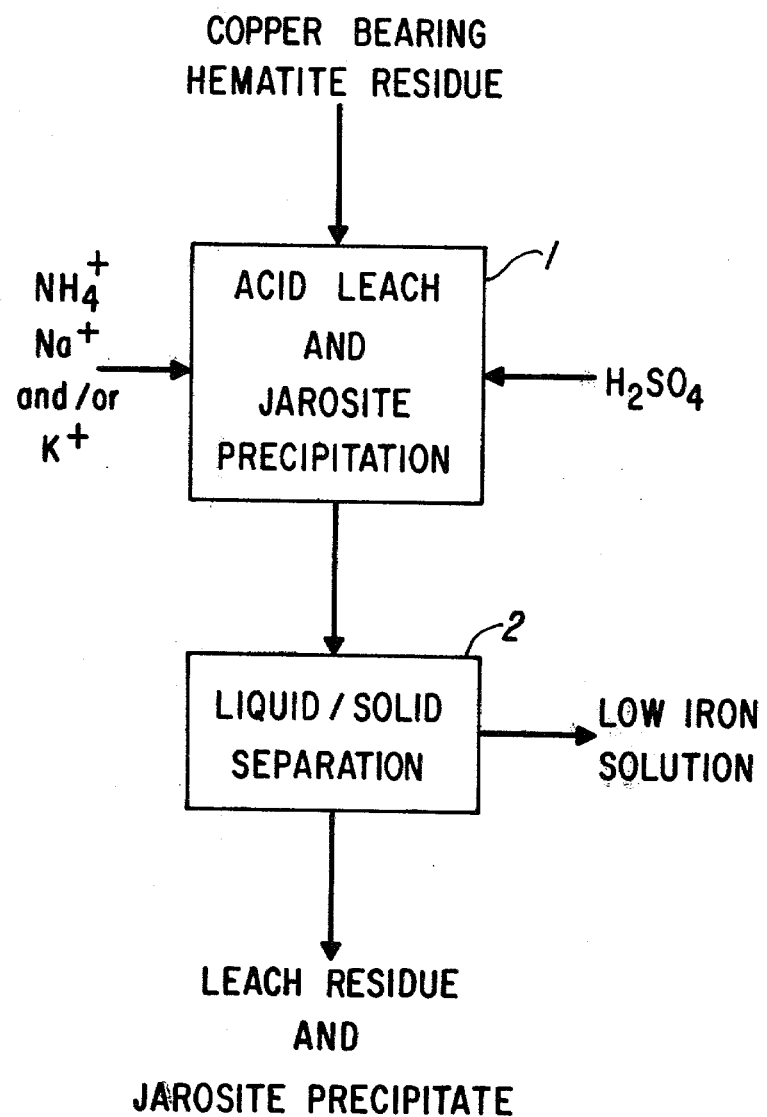
FIG. 1 illustrates a flowsheet of the basic process of the present invention.
Figure 2:
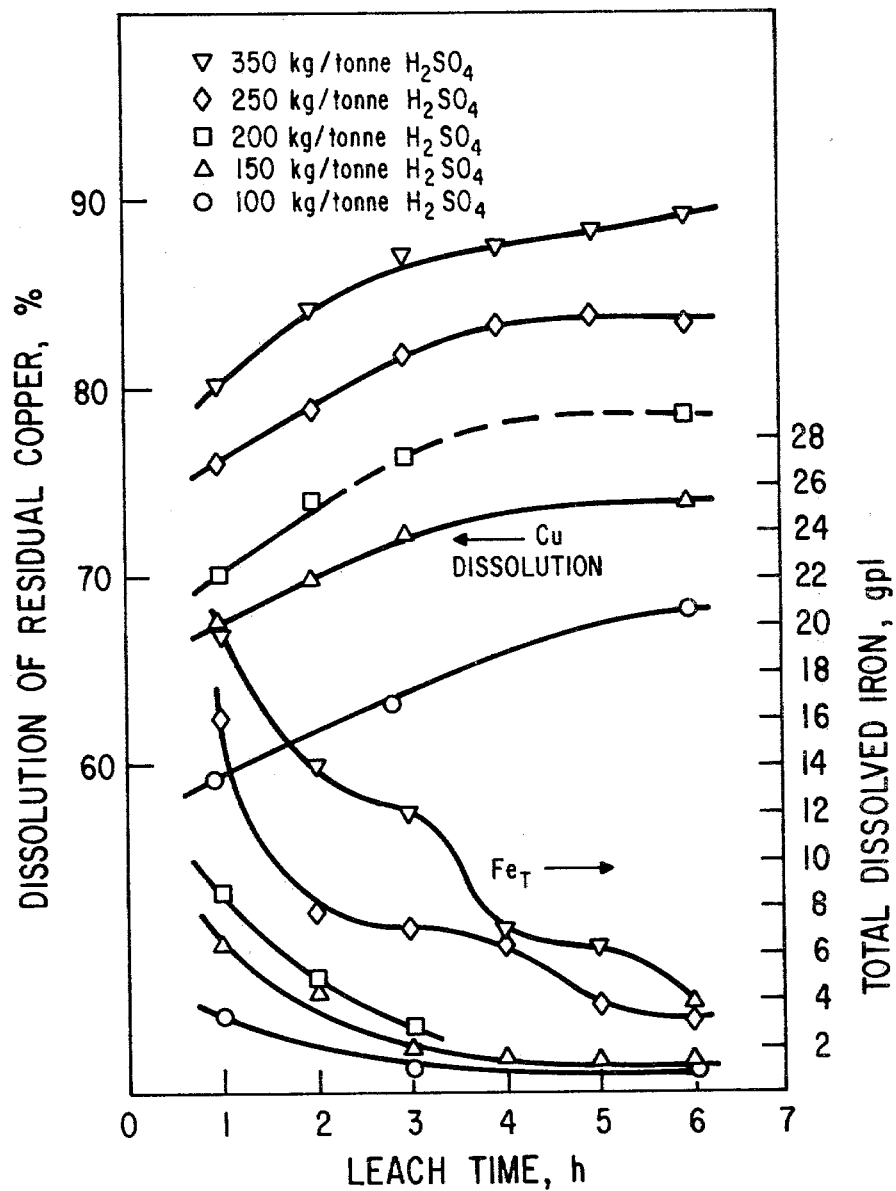
FIG. 2 is a graphical representation illustrating the effect of leaching time and acid addition on copper and iron dissolution from a hematite residue using the process of the present invention.

The simplicity and effectiveness of the novel process is illustrated by FIG. 1. As shown in this figure, the copper-bearing hematite residue is introduced into a tank at 1 together with sufficient sulphuric acid to start dissolution of the hematite and a source of ammonium, sodium or potassium ions, such as ammonium sulphate, sodium sulphate or potassium sulphate. In the presence of these ions, the precipitation of iron as a jarosite takes place in this tank, thus releasing sulphuric acid which dissolves more hematite and continues the leaching single stage operation. The temperature at 1 is maintained between about 80° C. and the boiling point of the leach solution, preferably at about 95°-98° C., and the reaction continues until substantially all the hematite has been dissolved, and sufficient ferric iron has been precipitated from solution. This point is normally reached in 3–6 hours for a wide range of acid addition rates, and thereafter a liquid-solid separation is effected at 2 to separate the low iron liquor from the leach residue. The copper which is uniformly distributed in the hematite phase, apparently in association with sulphate ion, dissolves and remains in the final low iron solution which contains less than 5 gpl dissolved iron. The final residue consists of a mixture of jarosite, unreacted hematite, elemental sulphur and gangue. The degree of copper extraction achieved depends on the amount of sulphuric acid initially added and on the leaching time as illustrated in FIG. 2.

Figure 3:
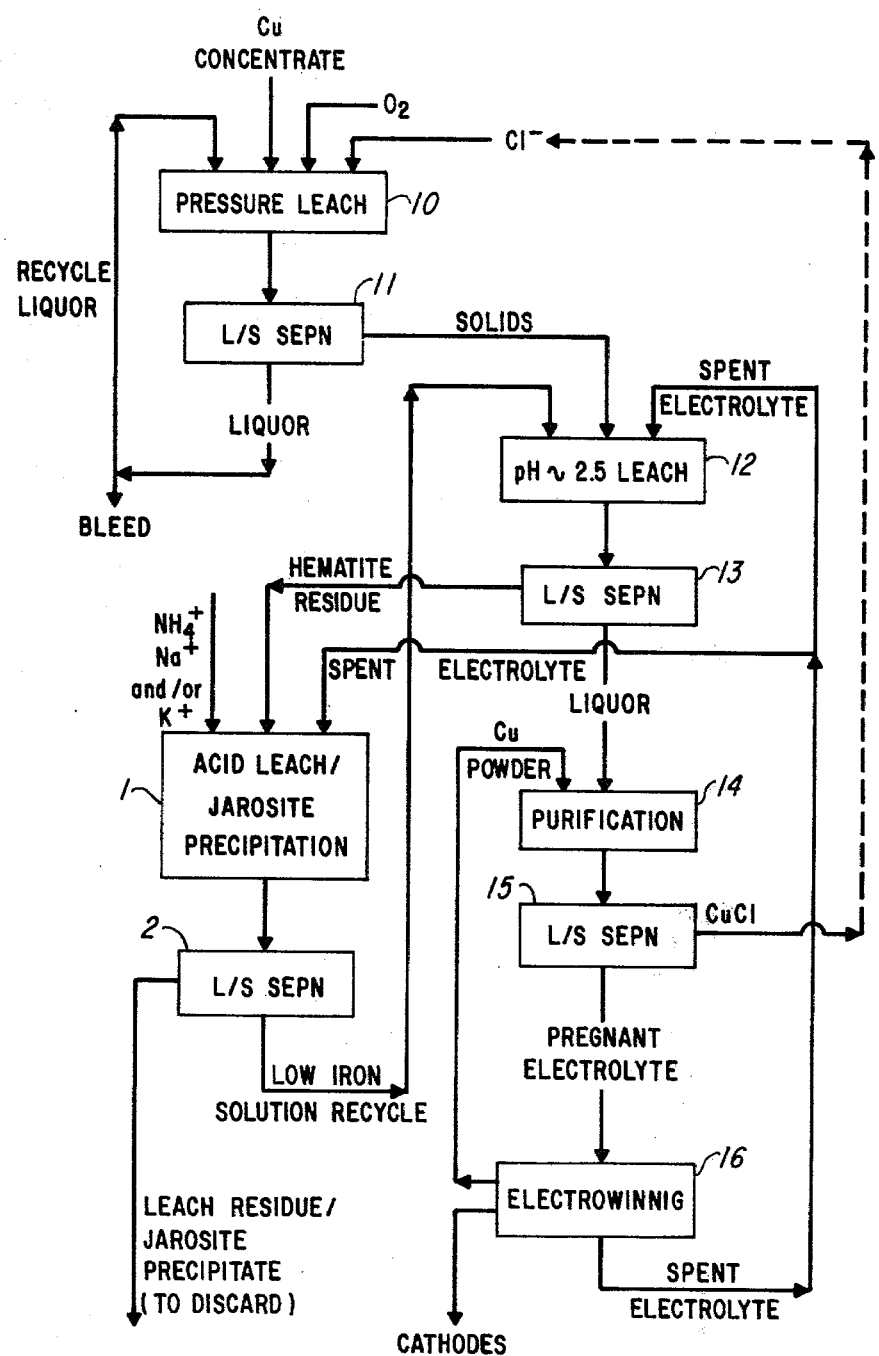
FIG. 3 illustrates a flowsheet of a preferred embodiment of the process, according to the present invention.

Taken in conjunction with the process described in Canadian Pat. No. 994,109, the process of this invention provides a novel hydrometallurgical process for the recovery of about 96–99% of the copper values from copper concentrates, according to the flowsheet illustrated in FIG. 3. As shown in this figure, the copper concentrates are subjected to a pressure leach at 10 in the presence of chloride ions so as to transform a major portion of the copper values present in the concentrates into a solid basic copper sulphate. Then the leach residue containing the solid basic copper sulphate is separated from the leach solution or liquor at 11 and is then subjected to a mild sulphuric acid leach (pH ~ 2.5) at 12 to form a high-copper, low-iron solution while most of the leach liquor from 11 is recycled back to the pressure leach 10. The high-copper, low-iron solution formed at 12 is then separated at 13 from the remaining hematite residue and is purified at 14 to remove chloride ions and minor element impurities. Such purification treatments are well known in the art and they can be effected, for example, by addition of Cu powder. After the purification at 14, a liquid-solid separation is carried out at 15 to separate the solid impurities such as CuCl (which can be recycled to the pressure leach stage 10) from the pregnant electrolyte which is then subjected to electrowinning at 16 to produce cathode copper. The spent electrolyte from 16 can be recycled and reused for leaching operations at 12 and at 1 where the solids from the liquid-solid separation 13 are treated according to the present invention.

The treatment of the solids at 1 is carried out generally as already described in conjunction with FIG. 1, namely they are subjected to an acid leach-jarosite precipitation treatment in the presence of ammonium, sodium and/or potassium ions. Then, after the liquid-solid separation 2, the final low-iron liquor, which contains less than 5 gpl dissolved iron, can be recycled to the basic copper sulphate dissolution stage 12 where the contained copper values enter the feed to the electrowinning operation 16 and the iron precipitates as ferric hydroxide. The leach residue from 2 is discarded.

The invention will now further be illustrated by the following non-limitative examples:

EXAMPLE 1

This example illustrates the prior art as covered by Canadian Pat. No. 994,109.

A 2 kg sample of a copper flotation concentrate from the Brenda Mine in British Columbia, assaying 22.2% Cu, 24.7% Fe, 28.6% S, was leached in 6 L of a solution containing 19 gpl $Cu^{2+}$, 10.2 gpl $Cl^-$, 13.8 gpl $SO_4^{2-}$ at 135° C., under 200 psi oxygen partial pressure for 90 min. 99.6% of the chalcopyrite copper was oxidized.

The solid residue from the pressure leach, assaying 18.3% Cu, 19.9% Fe, was filtered from the pressure leach liquor, and leached in dilute sulphuric acid solution at 40° C. at a pH of 2.5 for 60 minutes. The resulting leach residue assayed 2.3% Cu, 31.7% Fe. The overall extraction of copper from concentrate to solution at this point was 92.1%.

The leach residue (2.3% Cu, 31.7% Fe) was leached in a strong sulphuric acid solution at 95° C. using 250 kg $H_2SO_4$/tonne residue, to yield a solution containing 28 gpl Fe, 5.2 gpl Cu. The overall copper extraction from concentrate to solution in this three stage process was 98.2%, but 31.5% of the iron dissolved in the final stage. As previously indicated, such high iron solutions are not readily amenable to normal methods of copper recovery.

EXAMPLES 2–6

These examples illustrate an improved process conducted according to the method of the present invention.

Two samples of copper-bearing hematite residue were prepared by the two stage procedure described in Example 1. Sample A assayed 2.3% Cu, 31.7% Fe, and represented the residue remaining after 92.1% of the original copper content of the concentrate had been extracted after the first two stages of the flowsheet shown in FIG. 3, namely at 13 of FIG. 3. Sample B assayed 2.2% Cu, 31.5% Fe and represented the residue remaining after 93.4% of the original copper content of the concentrate had been extracted after the first two stages at 13 of FIG. 3.

Examples 2–6 comprise a series of tests carried out according to the method of the invention, with different levels of initial sulphuric acid addition (100–350 kg $H_2SO_4$/tonne of residue).

In each test, a specified amount of sulphuric acid was added to an aqueous slurry of the copper-bearing hematite residue heated to 95°–98° C. A calculated amount of ammonium sulphate was added to the leach slurry to promote the precipitation of iron as ammonium jarosite. Small additions of manganese ore were added as an oxidizing agent to oxidize any ferrous ions during the course of the leach, which is a well known technique. The duration of the tests was 3 to 6 h.

The test results are tabulated in the following Table and the behaviour of copper and iron in the system is further illustrated by FIG. 2.

TABLE

SINGLE STAGE ACID LEACH - JAROSITE PRECIPITATION[1, 2]

| Example No. | Acid Addition Kg/Tonne | Acid Addition gpl | $MnO_2$[3] Additions Kg/Tonne | $MnO_2$[3] Additions gpl | $(NH_4)_2SO_4$ Additions Kg/Tonne | $(NH_4)_2SO_4$ Additions gpl | Time h | Cu Extn. % | Cu gpl | Iron gpl Fe (T) | Iron gpl $Fe^{++}$ | Free Acid gpl | Overall[4] Cu Extn. % |
|---|---|---|---|---|---|---|---|---|---|---|---|---|---|
| 2 | 100 | 28.5 | 20.0 | 5.7 | 77.0 | 22.0 | 1 | 59.4 | 3.2 | 3.4 | 1.8 | — | 97.2 |
|   |     |      |      |     |      |      | 3 | 62.9 | 3.3 | 1.2 | 2.0 | — | 97.5 |
|   |     |      |      |     |      |      | 6 | 67.1 | 3.7 | 1.3 | N.D.[5] | N.D. | 97.7 |
| 3 | 150 | 42.8 | 20.0 | 5.7 | 77.0 | 22.0 | 1 | 67.6 | 4.1 | 6.3 | 3.0 | — | 97.4 |
|   |     |      |      |     |      |      | 3 | 72.3 | 4.3 | 1.8 | 0.4 | — | 97.7 |
|   |     |      |      |     |      |      | 6 | 74.0 | 4.4 | 1.4 | 0.9 | 9.2 | 97.9 |
| 4 | 200 | 57.1 | 25.0 | 7.1 | 77.0 | 22.0 | 1 | 70.0 | 3.8 | 8.3 | 3.1 | — | 97.9 |
|   |     |      |      |     |      |      | 3 | 76.4 | 4.1 | 3.1 | 0.9 | N.D. | 98.4 |
| 5 | 250 | 71.4 | 30.0 | 8.6 | 77.0 | 22.0 | 1 | 76.2 | 4.6 | 16.1 | 2.8 | — | 98.0 |
|   |     |      |      |     |      |      | 3 | 82.0 | 4.9 | 7.1 | 1.9 | — | 98.5 |
|   |     |      |      |     |      |      | 6 | 83.6 | 5.0 | 3.8 | 1.8 | 14.9 | 98.6 |
| 6 | 350 | 100.0 | 40.0 | 11.4 | 162.5 | 46.4 | 1 | 80.2 | 4.8 | 19.9 | 3.7 | — | 98.3 |
|   |     |      |      |     |      |      | 3 | 87.2 | 5.2 | 11.4 | 5.0 | — | 98.9 |
|   |     |      |      |     |      |      | 6 | 89.2 | 5.3 | 3.7 | 1.4 | 23.5 | 99.0 |

[1]Leach conditions: 95–98° C., 22% solids.
[2]Examples 3, 5 and 6 relate to Sample A. Examples 2 and 4 relate to Sample B.
[3]Total over test period.
[4]Overall copper extraction from concentrate.
[5]N.D. - not determined.

In all the tests, the final dissolved iron concentration was less than 5 gpl, while the dissolved copper concentration ranged from 3.7–5.3 gpl. The overall extraction of copper from concentrate to solution in the three-stage process of FIG. 3 ranged from 97.7% at 100 kg $H_2SO_4$/tonne to 99.0% at 350 kg $H_2SO_4$/tonne of residue acid addition rates after 3 to 6 hours of treatment in the third stage involving the single stage acid leach-jarosite precipitation.

These data indicate the flexibility and stability of the novel process, and also demonstrate its capacity for removing surplus iron and sulphate from the process by jarosite precipitation to maintain a satisfactory overall iron-sulphate balance.

The novel process, therefore, provides an important advance in the art of copper hydrometallurgy.

We claim:

1. A hydrometallurgical method of recovering copper values from copper concentrates which comprises:
   (a) forming an aqueous leach solution containing chloride or bromide ions in a predetermined concentration;
   (b) dispersing copper concentrates in said leach solution to form a slurry;
   (c) carrying out the leaching operation of said slurry at an elevated temperature and under an overpressure of oxygen as well as with the concentration of the chloride or bromide ions such as to transform a major portion of the copper values present in the concentrates into a solid basic copper sulphate;
   (d) separating resulting leach residue containing such basic copper sulphate from the leach solution;
   (e) dissolving said residue containing basic copper sulphate in a mild sulphuric acid leach to form a high-copper, low-iron solution;
   (f) separating said high-copper, low-iron solution from remaining hematite residue and purifying it to remove chloride or bromide ions and minor element impurities and then subjecting said purified solution to electrowinning for recovery of copper;
   (g) leaching the remaining hematite residue in an aqueous sulphuric acid solution and in the presence of ammonium, sodium and/or potassium ions to simultaneously solubilize copper values still remaining in the hematite residue, while converting a major portion of the hematite to ammonium, sodium and/or potassium jarosite thereby producing a low iron, copper-bearing solution containing less than 5 gpl dissolved iron therein; and
   (h) separating the resulting low-iron, copper-bearing solution from the jarosite containing residue and recycling it to the mild sulphuric acid leach step (e).

2. Method according to claim 1, wherein the leaching of the hematite residue in step (g) is carried out with the use of spent electrolyte from step (f).

3. Method according to claim 2, wherein the mild sulphuric acid leach step (e) is carried out at a pH of about 2.5 using a mixture of spent electrolyte from step (f) and of the recycled low-iron, copper-bearing solution from step (h).

4. Method according to claim 3, wherein the jarosite precipitation provides a removal of surplus iron and sulphate from the process, thereby maintaining a satisfactory overall iron and sulphate balance.

* * * * *